(12) United States Patent
Ferraro et al.

(10) Patent No.: US 9,642,488 B2
(45) Date of Patent: May 9, 2017

(54) BEVERAGE PRODUCING MACHINE WITH A JUG

(71) Applicant: KONINKLIJKE PHILIPS N.V., Eindhoven (NL)

(72) Inventors: Andrea Ferraro, Eindhoven (NL); Marco Santini, Eindhoven (NL)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 0 days.

(21) Appl. No.: 14/890,523

(22) PCT Filed: Jun. 27, 2014

(86) PCT No.: PCT/EP2014/063686
§ 371 (c)(1),
(2) Date: Nov. 11, 2015

(87) PCT Pub. No.: WO2015/000805
PCT Pub. Date: Jan. 8, 2015

(65) Prior Publication Data
US 2016/0106257 A1    Apr. 21, 2016

(30) Foreign Application Priority Data
Jul. 3, 2013    (EP) ..................................... 13174927

(51) Int. Cl.
*A47J 31/00* (2006.01)
*A47J 31/44* (2006.01)
*A47J 31/58* (2006.01)

(52) U.S. Cl.
CPC ....... *A47J 31/4489* (2013.01); *A47J 31/4403* (2013.01); *A47J 31/4407* (2013.01); *A47J 31/4485* (2013.01); *A47J 31/58* (2013.01)

(58) Field of Classification Search
CPC .......................... A47J 31/4485; A47J 31/4489
(Continued)

(56) References Cited

U.S. PATENT DOCUMENTS

2007/0243305 A1    10/2007    Marconi
2011/0174162 A1    7/2011    Ullmann
(Continued)

FOREIGN PATENT DOCUMENTS

WO    2006122916 A1    11/2006
WO    2010044116 A2    4/2010
(Continued)

OTHER PUBLICATIONS

WO 2014/087280 (Castelli et al.) Jun. 2014.*

*Primary Examiner* — Reginald L Alexander (57) ABSTRACT

A beverage producing system includes a beverage producing machine and a jug. The machine is provided with a steam nozzle and the jug is provided with a steam duct having a steam inlet end configured to connect to the steam nozzle to establish a connection between the steam nozzle and the steam duct. The steam nozzle is housed in a recess having an entry aperture, a bottom wall and an upper ceiling. The steam nozzle is arranged at the bottom wall of the recess and is oriented towards the upper ceiling. The steam inlet end projects from the jug, where the connection between the steam nozzle and the steam duct is configured to be established by introducing the steam inlet end in the recess and by lowering the jug until a fluid connection is established between the steam nozzle and the steam inlet end of the steam duct.

13 Claims, 6 Drawing Sheets

(58) Field of Classification Search
USPC .............. 99/323.1, 295, 293; 261/DIG. 76, 261/DIG. 16
See application file for complete search history.

(56) References Cited

U.S. PATENT DOCUMENTS

| | | | | |
|---|---|---|---|---|
| 2012/0125202 A1* | 5/2012 | Remo | ............... | A47J 31/60 99/286 |
| 2012/0222561 A1* | 9/2012 | Tonelli | ............ | A47J 31/4485 99/293 |
| 2012/0297989 A1* | 11/2012 | Tonelli | ............ | A47J 31/4485 99/293 |

FOREIGN PATENT DOCUMENTS

| | | |
|---|---|---|
| WO | 2011064702 A1 | 6/2011 |
| WO | 2012113457 A1 | 8/2012 |

* cited by examiner

Fig.1

BEVERAGE PRODUCING MACHINE WITH A JUG

This application is the U.S. National Phase application under 35 U.S.C. §371 of International Application No. PCT/EP2014/063686, filed on Jun. 27, 2014, which claims the benefit of International Application No. 13174927.7 filed on Jul. 3, 2013. These applications are hereby incorporated by reference herein.

FIELD OF THE INVENTION

The present invention concerns the field of beverage-producing machines. In particular, the invention concerns improvements in coffee-makers or similar beverage-producing machines, particularly for household applications.

BACKGROUND OF THE INVENTION

Household beverage producing machines, in particular coffee producing machines, are becoming more and more popular. Some beverage producing machines are relatively simple and provide only for the production of coffee, such as fresh-brew coffee or espresso coffee. Other more developed beverage producing devices and systems are designed for producing coffee-based beverages comprising milk, such as cappuccino, latte macchiato and similar coffee and milk containing beverages.

A system for producing such kind of beverages is disclosed for example in WO-A-2010/044116. This known beverage producing system comprises a beverage producing machine and a jug for containing milk. The jug is provided with a milk emulsifier or milk frothing device. The beverage producing machine is provided with a steam nozzle which is arranged in a recess and is downwardly oriented so that it can be introduced into a corresponding steam inlet provided on top of the jug. To enable the insertion movement, the steam nozzle is slanted and oriented so as to project outside the recess provided on the coffee producing machine. The hot and pressurized steam delivered by the coffee producing machine through the steam nozzle is processed in a Venturi tube of the emulsifier to suck milk from the jug and heat the milk. The emulsifier is further provided with an air port, through which air can be sucked and mixed with the milk to form an air-milk froth which is heated by the steam. The air port can be selectively closed or opened, depending on whether the hot milk or hot and emulsified milk is required. The hot and optionally emulsified milk is then dispensed from the jug into a cup.

In order to prevent any hazard due to accidental dispensing of hot steam, these known beverage producing systems are provided with sensors capable of detecting whether a milk jug is properly connected to the coffee machine. Only if the jug is correctly positioned and connected to the steam nozzle of the coffee producing machine, steam delivery is enabled. This prevents the risk of hot stem being ejected from the steam nozzle against the user.

These sensors, which are required for safety purposes, increase substantially the cost of the machine, also because they have to be interfaced with a control unit and the latter must be suitably programmed to control the enablement of the steam dispensing cycle based upon the signal received from the sensors.

SUMMARY OF THE INVENTION

The invention provides for a simpler, but safe beverage producing machine, having a reduced number of electric and electronic components, in particular where a sensor detecting the proper positioning of the jug can be dispensed with.

According to the invention a beverage producing system is provided, comprising a beverage producing machine and a jug, wherein the beverage producing machine is provided with a steam nozzle and the jug is provided with a steam duct having a steam inlet end designed and arranged for connection to the steam nozzle. The steam nozzle is housed in a recess having an entry aperture, a bottom wall and an upper ceiling. The steam nozzle is arranged at the bottom wall of the recess and is oriented towards the upper ceiling. The steam inlet end of the steam duct projects from the jug, such that a connection between the steam nozzle and the steam duct is established by introducing the steam inlet end in the recess and by lowering the jug until a fluid connection is established between the steam nozzle and the steam inlet end of the steam duct.

The jug can be connected to the beverage producing machine with a very simple and intuitive movement. Moreover, the arrangement of the steam nozzle in the recess and the orientation of the steam nozzle against the ceiling of the recess makes the arrangement intrinsically safe, since if a steam jet is generated without the jug being properly connected to the beverage producing machine, the hot and pressurized steam will not escape the recess, but will rather lose its energy impinging against the ceiling or being collected in an inner volume provided above the recess in the housing of the beverage producing machine.

In preferred embodiments, the steam inlet end is arranged on a jug projection, which protects the steam inlet end against shocks or other potentially damaging actions.

The jug can include a jug body and a cover. In some embodiments a frothing device, e.g. a milk frothing device, can be housed in or on the cover. The steam duct can be arranged on the cover and preferably the steam inlet end of said steam duct can be arranged in a projection formed on or supported by the cover.

To make the connection between the jug and the beverage producing machine even easier and more intuitive, according to some embodiments a guide arrangement for guiding the jug during connection to the beverage producing machine can be provided. For instance, a male member and a female member can be arranged on the jug and on the beverage producing machine, respectively, or vice versa. The male member engages the female member when the steam inlet end is aligned with the steam nozzle, so that the subsequent lowering movement of the jug is properly guided. In some embodiments, the guide arrangement can also provide for a mechanical connection between the jug and the beverage producing machine, which prevents erroneous movements of the jug, which might damage the steam nozzle and/or the steam inlet end of the steam duct on the jug.

In some embodiments a mechanical coupling can be provided by a wedge-shaped connection arrangement between the beverage producing machine and the jug, for facilitating connection between the jug and the beverage producing machine. The wedge-shaped connection arrangement can comprise a wedge-shaped projection on the jug and a wedge-shaped cavity on the beverage producing machine, or vice versa. In preferred embodiments the cross section of said two wedge-shaped members is shaped so as to form an undercut, mutually engaging the jug and the beverage producing machine.

In some embodiments, a protective member, such as an appendage or a tongue, can be provided at the entry aperture of the recess, to protect the steam nozzle against accidental impact against the jug.

BRIEF DESCRIPTION OF THE DRAWINGS

A more complete appreciation of the invention and many of the advantages thereof will be readily obtained as the same becomes better understood by reference to the following detailed description when considered in connection with the accompanying drawings, which show one exemplary non-limiting embodiment of the invention. In the drawings.

DETAILED DESCRIPTION OF EMBODIMENTS

The following detailed description of exemplary embodiments refers to the accompanying drawings. The same reference numbers in different drawings identify the same or similar elements. Additionally, the drawings are not necessarily drawn to scale. Also, the following detailed description does not limit the invention. Instead, the scope of the invention is defined by the appended claims.

Reference throughout the specification to "one embodiment" or "an embodiment" or "some embodiments" means that the particular feature, structure or characteristic described in connection with an embodiment is included in at least one embodiment of the subject matter disclosed. Thus, the appearance of the phrase "in one embodiment" or "in an embodiment" or "in some embodiments" in various places throughout the specification is not necessarily referring to the same embodiment(s). Further, the particular features, structures or characteristics may be combined in any suitable manner in one or more embodiments.

Figure 1:
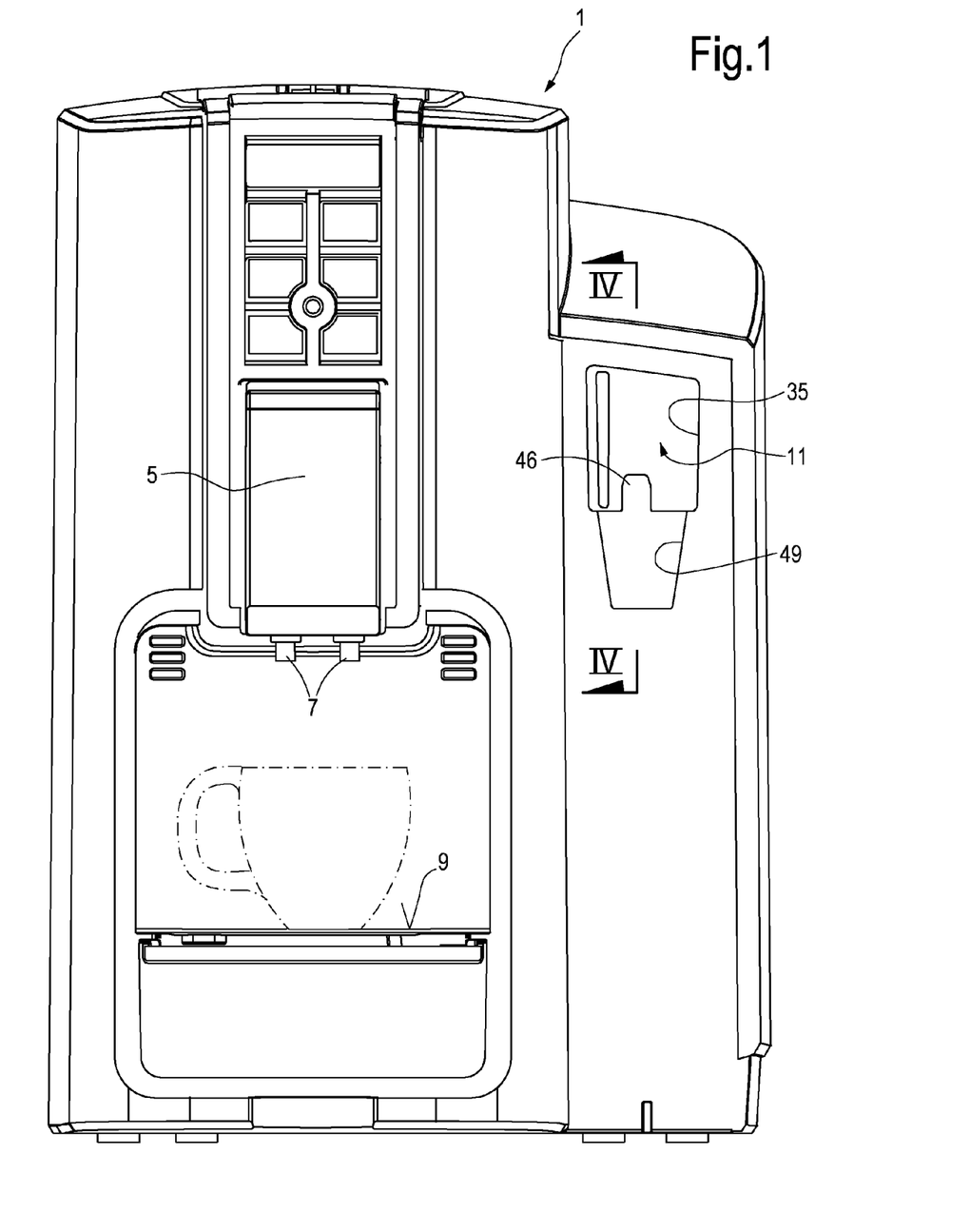
FIG. 1 illustrates a front view of a beverage producing machine.
Figure 2:
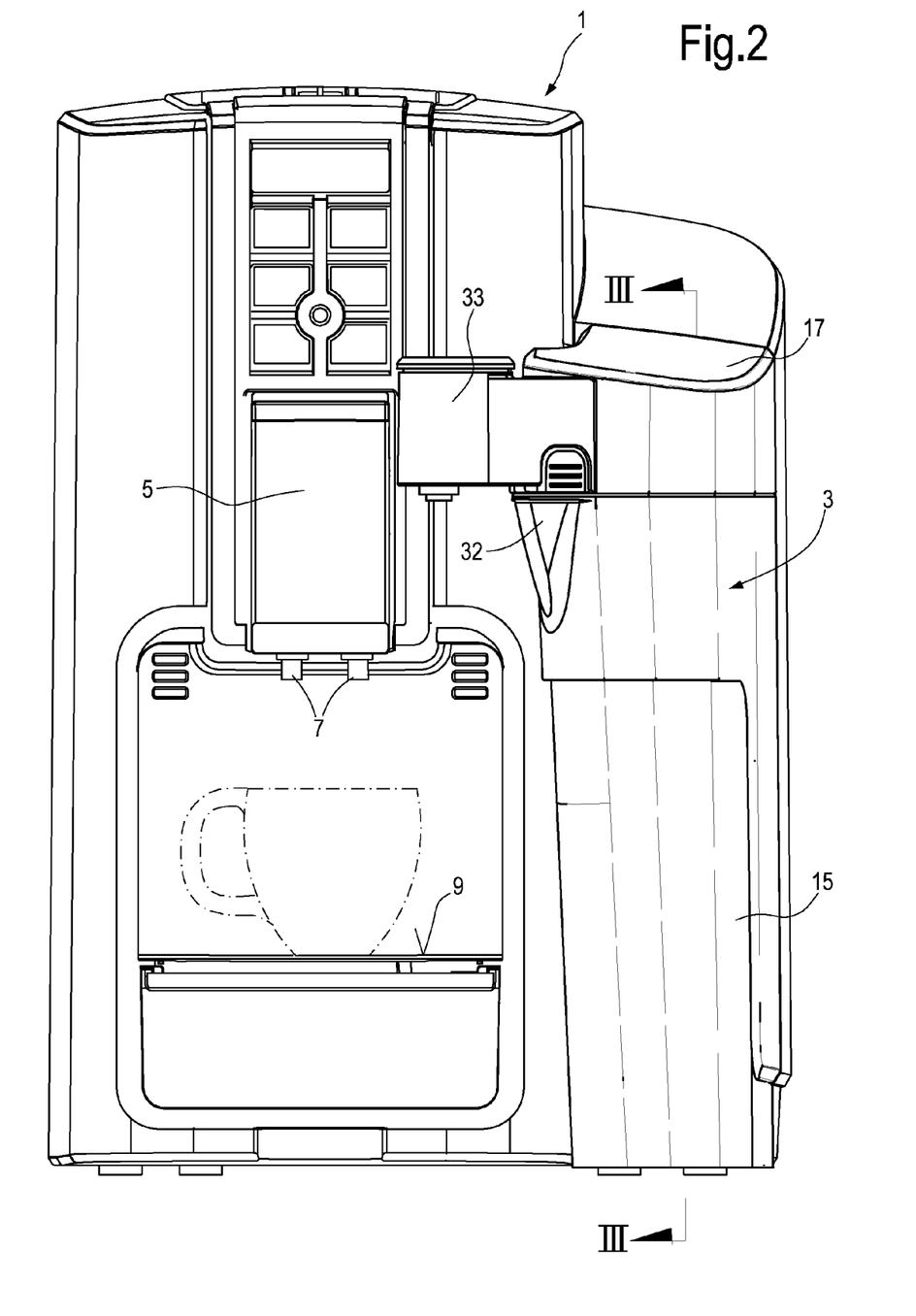
FIG. 2 illustrates a front view similar to FIG. 1, with a jug connected to the beverage producing machine.

FIGS. 1 and 2 show a front view of a beverage producing machine 1 embodying the invention. In some embodiments the beverage producing machine is a coffee machine. Here below reference will be made to this kind of machines, but it shall be understood that the concept underlying the invention can be usefully utilized also in other kind of beverage producing machines.

Figures 11, 12, 13:
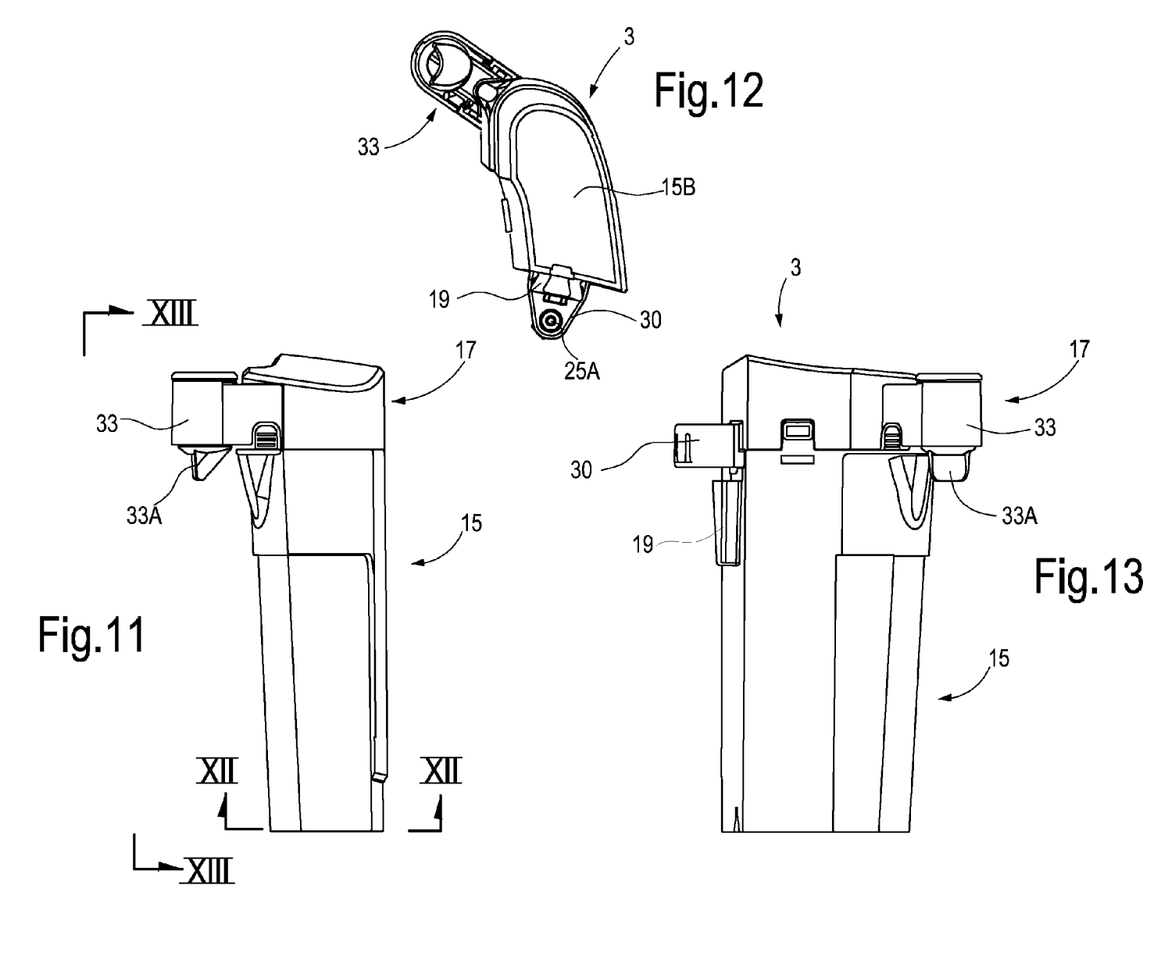
FIG. 11 illustrates front view similar to FIG. 8 of the jug in a modified version and with the cover mounted on the body.
FIG. 12 illustrates a bottom view of the jug of FIG. 11 according to line XII-XII of FIG. 11.
FIG. 13 illustrates a view according to line XIII-XIII of FIG. 11

The coffee producing machine 1 can be combined with a milk jug 3, shown in its operating position in FIG. 2. In FIG. 1 the milk jug is removed. FIGS. 3-10 illustrate in various views and sections the jug in a possible embodiment. FIGS. 11-13 illustrate a modified embodiment of the jug.

The coffee producing machine 1 is provided with a coffee dispensing unit 5 which in turn can be provided with one or more coffee nozzles. By way of example only in FIGS. 1 and 2 two coffee nozzles 7 are provided. The coffee nozzle(s) 7 are oriented downwardly towards a cup supporting grid 9 arranged under the coffee dispensing unit 5. A beverage container, such as a cup or a glass, can be placed on the grid 9 to collect coffee dispensed through the coffee nozzle(s) 7.

The coffee producing machine 1 is further provided with a recess 11. The recess 11 is preferably arranged on the front side of the coffee machine 1 and has an opening facing the user. As will be described in greater detail later on, the recess 11 houses a steam nozzle wherefrom hot and pressurized steam is delivered by the coffee producing machine 1 to a milk frothing device housed in the jug 3.

In some embodiments the jug 3 comprises a jug body 15 and a jug cover 17. The jug body 15 has a side wall 15A and a bottom wall 15B. Along the side wall 15A the jug body 15 can be provided with a wedge-shaped projection 19, which forms a mechanical connection with the coffee producing machine 1, as will be disclosed in greater detail later on.

In some embodiments the jug 3 is provided with a milk frothing device 21. In some exemplary embodiments, the milk frothing device can be housed in or supported by the jug cover 17.

The milk frothing device 21 can be comprised of a steam conduit 23 which is in fluid communication with a steam duct 25 having a steam inlet end 25A, designed and arranged for connection with a steam nozzle provided in recess 11 of the coffee producing machine 1.

The frothing device 21 is in fluid communication with a milk suction pipe 27 extending in the jug body 15 towards the bottom 15B thereof for sucking milk from the jug 3. Pressurized steam generated by the coffee producing machine 1 is delivered through the steam duct 25 to the milk frothing device 21 to generate a suction effect to suck milk through the milk suction pipe 27 and to further suck air through an air inlet port, not shown. Frothed milk is delivered through a milk outlet port 29 into a milk dispensing nozzle 31 which can be arranged on an extension 33 of the cover 17. In some embodiments the extension 33 is shaped and dimensioned so that said extension 33 is positioned above the cup supporting grid 9 when the jug 3 is in its operating condition, see FIG. 2, in fluid communication with the coffee producing machine 1. With this arrangement frothed milk can be dispensed directly through the milk dispensing nozzle 31 into a cup placed under the coffee dispensing nozzle 7.

The jug body 15 can further be provided with a milk pouring lip 32 which can be used to pour milk directly from the jug into a cup or back into the milk bottle, for instance.

The structure and operation of a frothing device such as frothing device 21 are known per se and will not be described in greater detail.

In some embodiments, as shown in the modified embodiment of FIGS. 11-12, a deflector 33A can be provided at the outlet side of the frothing device 21, under the extension 33. The deflector deflects the frothed milk flow towards the cup.

Figure 3:
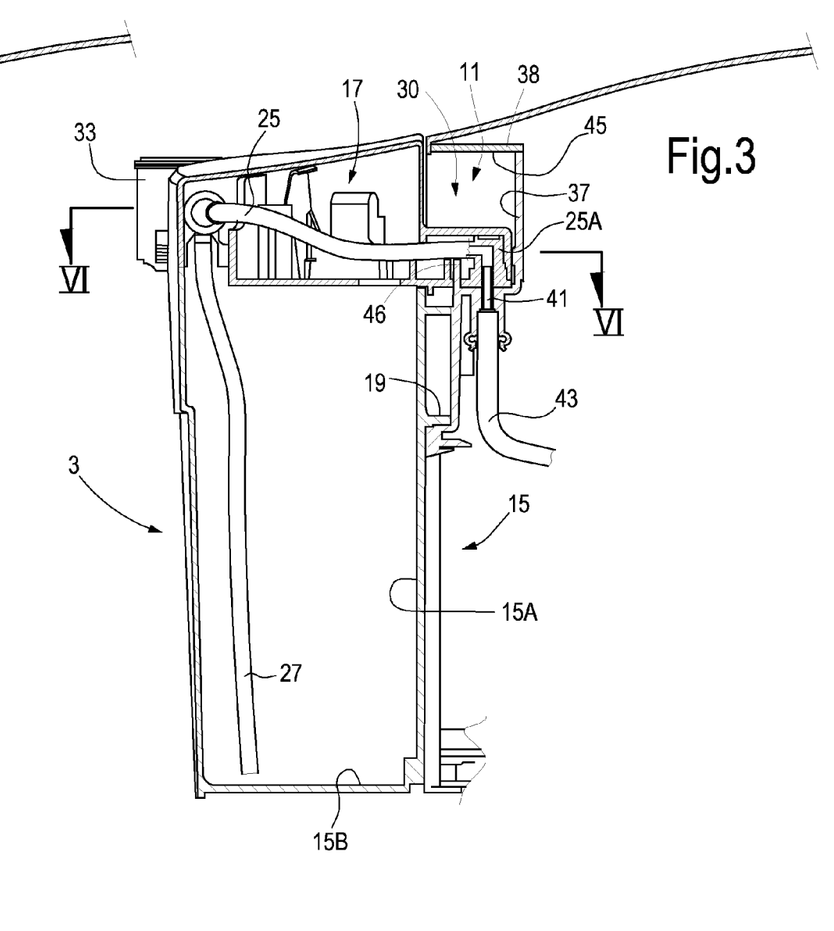
FIG. 3 illustrates a section according to a vertical plane of the jug connected to the steam nozzle of the beverage producing machine.

The steam inlet end 25A of the steam duct 25 can be located in a projection 30 formed on the jug 3. In some embodiments the projection 30 is formed on or supported by the jug cover 17. As best shown in Fig. 3 the steam inlet end 25A of the steam duct 25 faces downwardly and can make a fluid connection with the steam nozzle arranged in the recess 11, as will be described here below.

Figure 4:
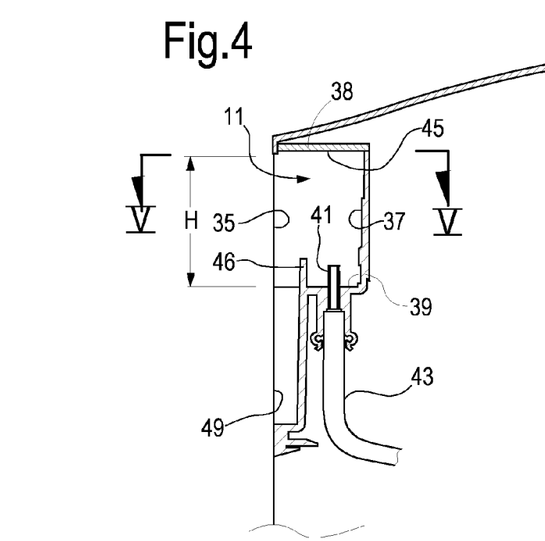
FIG. 4 illustrates a cross section according to line IV-IV of FIG. 1.
Figure 5:
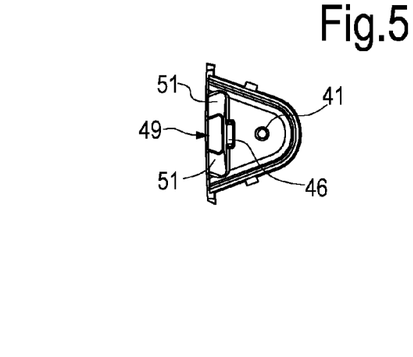
FIG. 5 illustrates a cross section according to line V-V of FIG. 4.
Figure 6:
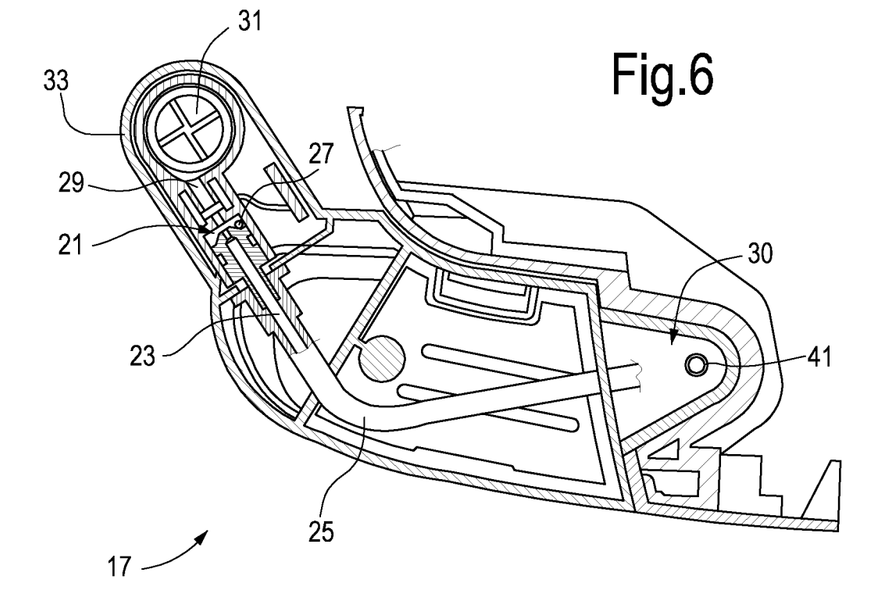
FIG. 6 illustrates a cross section according to line VI-VI of FIG. 3.
Figure 7:
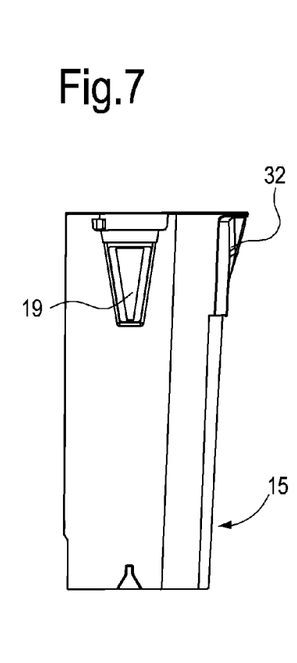
FIG. 7 illustrates a back view of the jug body.
Figure 8:
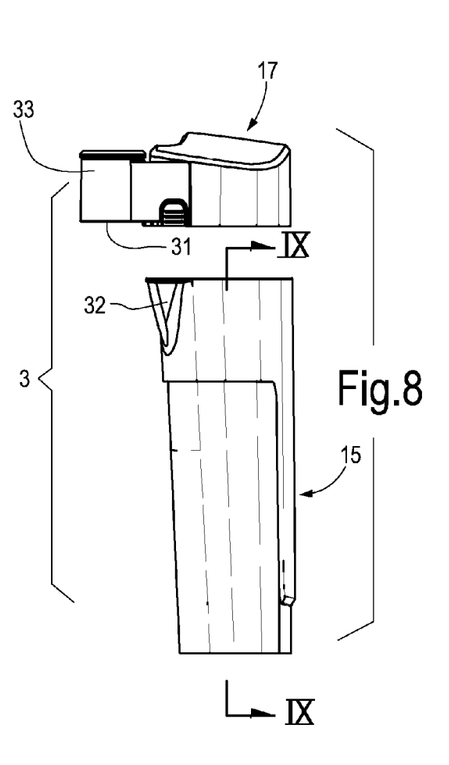
FIG. 8 illustrates a front view of the jug with the jug cover separate from the jug body.
Figure 9:
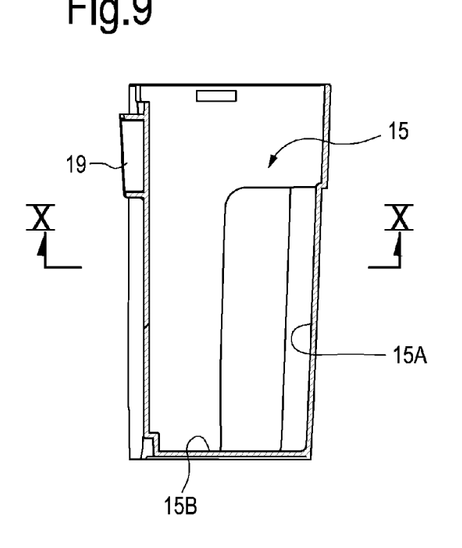
FIG. 9 illustrates a section according to line IX-IX of FIG. 8.
Figure 10:
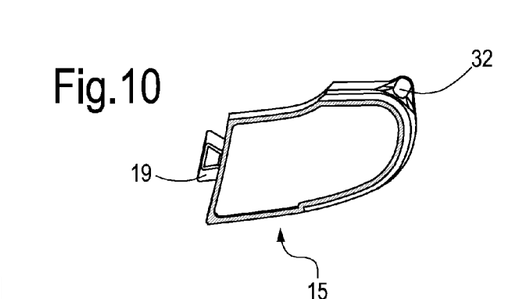
FIG. 10 illustrates a section along line X-X of FIG. 9.

As best shown in FIG. 4, the recess 11 comprises an entry aperture 35. The recess can further be comprised of a side wall 37 opposing the entry aperture 35. Furthermore, the recess can be provided with a bottom wall 39 wherefrom a steam nozzle 41 projects. The steam nozzle 41 can be in fluid communication with a steam pipe 43 where through steam from a steam generator is delivered to the steam nozzle 41. The steam nozzle is oriented towards a ceiling 45 arranged opposite the bottom wall 39. In some embodiments, the ceiling 45 can be closed by a wall or cover 38 (FIGS. 3 and 4), thus preventing penetration of steam or water into the housing of the coffee producing machine 1.

The aperture 35 can have a vertical dimension H which is sufficient for introducing the projection 30 of the jug 3 into the recess 11. The vertical dimension of the projection 30 is such that once the projection 30 has been introduced with a substantially horizontal movement into the recess 11, the jug 3 can be lowered until the steam inlet end 25A of the steam duct 25 establishes a connection with the steam nozzle 41 (FIG. 3).

In some embodiments, as illustrated in the drawings, the arrangement is such that the steam nozzle 41 is introduced into the steam inlet end 25A, the latter having an inner diameter equal to or larger than the outer diameter of the steam nozzle 41. In other embodiments, not shown, a reverse arrangement can be provided, with the steam inlet end 25A entering into the steam nozzle 41. A sealing arrangement, such as a sealing lip, a gasket or an O-ring can be provided to provide a sealing between the steam inlet end 25A and the steam nozzle 41.

In some embodiments, a closing valve can be provided, which automatically closes the steam nozzle and which is opened when a connection between the steam nozzle 41 and the steam inlet end 25 is established.

In some embodiments a protecting tongue 46 is arranged along the lower edge of the aperture 35 of the recess 11, so that the introduction of projection 30 into the recess 11 is performed in the correct position, i.e. with the projection placed above the top end of the steam nozzle 11 until the projection 30 is penetrated sufficiently into the recess 11. For example, the arrangement can be such that the projection 30 is introduced into the recess 11 until it makes contact with the side wall 37. Once this fully introduced position has been achieved, the jug 3 can be lowered to make a connection between the steam nozzle 41 and the steam inlet end 25A.

In addition to the hydraulic connection, i.e. the fluid connection formed by the steam nozzle 41 and the steam inlet end 25A, a further mainly mechanical connection between the jug 3 and the coffee machine 1 can be provided. Such further mechanical connection can be provided by the tongue 46 penetrating into a corresponding recess on the jug cover 17.

In preferred embodiments, a more stable further mechanical connection is provided by means of the abovementioned wedge-shaped projection 19 which is positioned and configured such as to penetrate into a notch or cavity 49 extending along the front panel of the coffee producing machine 1 under the aperture 35 of recess 11 (see FIGS. 1 and 3). The wedge-shaped projection 19 is introduced into the notch 49 during the movement performed by the jug 3 with respect to the coffee producing machine 1 for the introduction of the steam nozzle 41 into the steam inlet end 25A.

The notch or cavity 49 can be wedge-shaped similarly to the projection 19, as best shown in FIGS. 1, 3, 4 and 5. The cavity 49 forms side channels 51 (see FIG. 5) defining two undercuts wherein the projection 19 engages while lowering the jug 3 after having introduced the projection 30 into recess 11. The arrangement of projection 19 and cavity or notch 49 provides for a mechanical connection as well as for a guidance of the jug 3 during the lowering movement which establishes the connection between the steam nozzle 41 and the steam inlet end 25A of the steam duct 25. The wedge shape of the projection 19 and notch or cavity 49 further provides a centering effect which makes the alignment between the steam inlet end 25A with the steam nozzle 41 easier.

In other embodiments, a simple guide arrangement can be provided, instead of a mechanical connection. For instance, the projection 19 can be shaped with parallel side surfaces, engaging with corresponding parallel edges of a slot formed in the front panel of the coffee producing machine. This arrangement would provide for a guidance of the jug without establishing a mechanical link or connection.

In some embodiments, a mechanical link or connection between the jug 3 and the coffee producing machine 1 can be provided by a member separate from the members providing guidance of the jug during the lowering movement thereof. For instance, a hook-shaped projection on the jug 3 can engage with a hole in the coffee producing machine 1, or vice versa, once the jug 3 has achieved its final lower position with the steam inlet end 25A coupled with the steam nozzle 41.

As can be appreciated in particular from FIG. 4, the steam nozzle 41 is entirely housed within recess 11 and is preferably distanced from the entry aperture 35 thereof. The outlet of the steam nozzle 41 is oriented towards the ceiling 45 of the recess 11. Thanks to this special arrangement, if steam is ejected from the steam nozzle 11 without having properly connected the milk jug 3 to the coffee producing machine 1, the user is anyhow protected against damages caused by the hot steam jet. The steam jet will in fact be oriented towards the ceiling 45 and will be collected in that area, without generating hazardous steam flows projecting from the coffee producing machine 1 against the user. The steam then condenses on the ceiling 45 and/or in a space which can be provided in the interior of the housing of the coffee producing machine 1.

In some embodiments, the ceiling 45 of the recess 11 can be formed by a closed wall, against which an accidentally generated steam jet will impinge losing its energy. In other embodiments, the ceiling 45 can be opened towards the interior of the coffee producing machine 1 where a confined volume of sufficient dimension is provided for the steam to expand and condense without escaping the coffee producing machine 1. The steam nozzle arrangement according to the invention is therefore intrinsically safe and does not require the use of any sensor for determining whether the jug 3 has been properly connected with the coffee producing machine 1 before enabling steam dispensing.

While the disclosed embodiments of the subject matter described herein have been shown in the drawings and fully described above with particularity and detail in connection with several exemplary embodiments, it will be apparent to those of ordinary skill in the art that many modifications, changes, and omissions are possible without materially departing from the novel teachings, the principles and concepts set forth herein, and advantages of the subject matter recited in the appended claims. Hence, the proper scope of the disclosed innovations should be determined only by the broadest interpretation of the appended claims so as to encompass all such modifications, changes, and omissions. The word "comprising" does not exclude the presence of elements or steps other than those listed in a claim. The word "a" or "an" preceding an element does not exclude the presence of a plurality of such elements. In the device claim enumerating several means, several of these means may be embodied by one and the same item of hardware. The mere fact that certain measures are recited in mutually different dependent claims does not indicate that a combination of these measures cannot be used to advantage.

The invention claimed is:

1. A beverage producing system comprising a beverage producing machine and a jug, wherein the beverage producing machine comprises a steam nozzle and the jug comprises a steam duct having a steam inlet end configured to connect to the steam nozzle to establish a connection between the steam nozzle and the steam duct; wherein:
the steam nozzle is housed in a recess having an entry aperture, a bottom wall and an upper ceiling,
the steam nozzle is arranged at the bottom wall of the recess and is oriented towards the upper ceiling, and
the steam inlet end of the steam duct projects from the jug, the connection between the steam nozzle and the steam duct being configured to be established by introducing the steam inlet end in the recess and by lowering the jug until the connection is established between the steam nozzle and the steam inlet end of the steam duct.

2. The beverage producing system according to claim 1, wherein the steam inlet end is arranged on a jug projection.

3. The beverage producing system according to claim 1, wherein the jug further comprises a milk frothing device, having a steam conduit connected to the steam duct and a milk conduit comprised of a milk suction pipe extending towards a bottom of the jug.

4. The beverage producing system according to claim 1, wherein the jug comprises a jug body and a jug cover, and wherein the steam duct is arranged in the jug cover and the steam inlet end projects from the jug cover.

5. The beverage producing system according to claim 2, wherein the projection is one of integral with and supported by the jug cover.

6. The beverage producing system according to claim 1, further comprising a guide arrangement configured to the guide the jug during connection to the beverage producing machine.

7. The beverage producing system according to claim 6, wherein said guide arrangement comprises a male member and a female member, arranged respectively on the jug and on the beverage producing machine, or vice versa; said male member engaging said female member when the steam inlet end is aligned with the steam nozzle.

8. The beverage producing system according to claim 1, wherein the upper ceiling of the recess is closed by a cover.

9. The beverage producing system according to claim 1, further comprising a protecting tongue arranged at the entry aperture of the recess and in front of the steam nozzle.

10. The beverage producing system according to claim 1, wherein the connection between the steam nozzle and the steam duct is configured to be established by introducing, via a translation movement, the steam inlet end in the recess and by lowering the jug, via a further translation movement, until the connection is established between the steam nozzle and the steam inlet end of the steam duct.

11. The beverage producing system according to claim 1, wherein the connection between the steam nozzle and the steam duct is configured to be established by introducing the steam inlet end in the recess and by lowering the jug along a plane parallel to the entry aperture until the connection is established between the steam nozzle and the steam inlet end of the steam duct.

12. A beverage producing system comprising a beverage producing machine and a jug, wherein the beverage producing machine comprises a steam nozzle and the jug comprises a steam duct having a steam inlet end configured to connect to the steam nozzle to establish a connection between the steam nozzle and the steam duct; wherein:
the steam nozzle is housed in a recess having an entry aperture, a bottom wall and an upper ceiling,
the steam nozzle is arranged at the bottom wall of the recess and is oriented towards the upper ceiling, and
the steam inlet end of the steam duct projects from the jug, the connection between the steam nozzle and the steam duct being established by introducing the steam inlet end in the recess and by lowering the jug until the connection is established between the steam nozzle and the steam inlet end of the steam duct; and
the beverage producing system further comprising a mechanical coupling between the jug and the beverage producing machine, said mechanical coupling being configured to allow a vertical movement but prevent a horizontal movement in a mutual approaching direction of the jug with respect to the beverage producing machine during the connection of the steam duct on the jug and the steam nozzle on the beverage producing machine.

13. The beverage producing system according to claim 12, wherein the mechanical coupling comprises a wedge-shaped connection arrangement between the beverage producing machine and the jug configured to facilitate the connection between the jug and the beverage producing machine.

* * * * *